Sept. 27, 1932.  A. S. MILLER  1,879,812
IMPELLER REACTION ENVELOPE
Filed June 17, 1929   2 Sheets-Sheet 1

Arthur S. Miller  Inventor
By M. Talbert Lick
Attorney

Sept. 27, 1932.　　　A. S. MILLER　　　1,879,812
IMPELLER REACTION ENVELOPE
Filed June 17, 1929　　　2 Sheets-Sheet 2

Inventor
Arthur S. Miller
By M. Talbert Dick
Attorney

Patented Sept. 27, 1932

1,879,812

UNITED STATES PATENT OFFICE

ARTHUR S. MILLER, OF DES MOINES, IOWA

IMPELLER REACTION ENVELOPE

Application filed June 17, 1929. Serial No. 371,322.

The principal object of this invention is to reduce to serviceable thrust the energy imparted to a fluid by the centrifugal action of an impeller when the impeller is immersed in the fluid and set in rotative motion.

A second object of this invention is to provide a means of changing the direction of the resultant thrust of the impeller reaction envelope with reference to a supporting vessel.

A third object of this invention is to produce a thrust that is balanced with reference to the axis of impeller rotation.

A fourth object of this invention is to turn to useful thrust the centrifugal losses from a screw propeller when it is immersed in a fluid and set in rotative motion.

A fifth object of this invention is to provide about a rotative impeller a guard or shield against injury to or by the impeller.

A sixth object of this invention is the conversion to useful thrust of the energy in fluid currents which approach the intake of a centrifugal impeller when it is immersed in the fluid and set in rotative motion.

A seventh object of this invention is to provide a mechanism for the propulsion of crafts of burden which are floated on the surface of a fluid or which are suspended, either statically or dynamically, within a fluid, that may be operated efficiently at the high rotative speeds of modern prime movers.

In general terms, the object of this invention is to provide a device in the form of an impeller reaction envelope having foils and nozzles capable of collecting particles of fluid, such as gas or liquid, which have been energized by the centrifugal action of an impeller rotating in such fluid, of changing the initial direction of such particles, of discharging them and converting the resulting reaction into useful thrust.

These and other objects will be apparent to those skilled in the art.

My invention consists of the construction, arrangement and combination of the various parts of the device whereby the objects contemplated are attained, as hereinafter more fully set forth, pointed out in my claims and illustrated in the accompanying drawings, to which:

The terms "end view", "side view", "axial", "lateral" and "radial" refer to aspects of the impeller about which the reaction envelope is disposed and from the energy imparted by which the reaction envelope functions.

My reaction envelope with its impeller must be immersed in the fluid, such as a gas or a liquid, with which it is designed to act, and it will find its principal usefulness in the propulsion and control of crafts of burden which float upon the surface of, or which may be suspended within fluids by bouyancy or through dynamic action.

I have used the numeral 10 to designate the supporting member to which the device is secured, such as a boat, submarine or aircraft.

Figure 1:
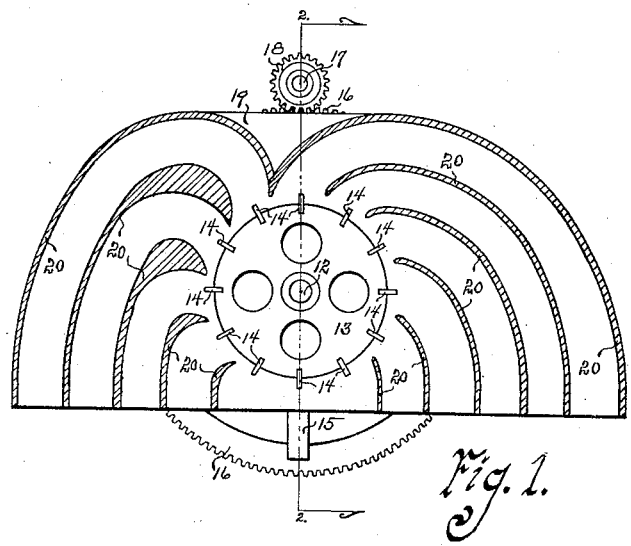
Fig. 1 is an end sectional view of my invention showing the preferred type of the reaction envelope which produces thrust parallel to the plane of impeller rotation.
Figure 2:
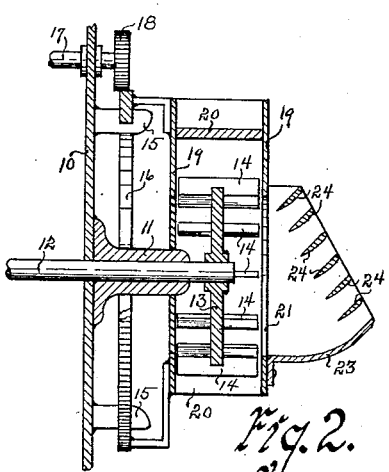
Fig. 2 is a side sectional view of the complete device secured to a suitable support and taken on line 2—2 of Fig. 1. This figure also shows the method of controlling the direction of the resultant thrust relative to the supporting member or vessel.
Figure 3:
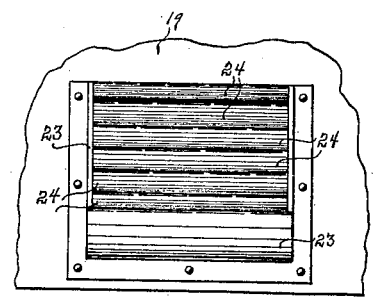
Fig. 3 is an end view of the fluid inlet opening of the reaction envelope showing the funnel with a plurality of guides mounted therein.

Secured by suitable means to this supporting member is the bearing member 11 having the impeller drive shaft 12 rotatably mounted therein, as shown in Fig. 1, and Fig. 2. This drive shaft is designed to be operatively connected to a prime mover not shown.

The numeral 13 designates the impeller, rigidly secured to the drive shaft 12, having blades 14. Extending from the supporting member are the bracket members 15, rotatably mounted on which is the large ring gear 16. The numeral 17 designates a control shaft rotatably mounted in the supporting member. Rigidly secured to this control shaft is a pinion 18 in engagement with the ring gear as shown in Fig. 1, and Fig. 2. It is to this ring gear 16 that my reaction envelope is secured and it is so positioned that it is concentric with the impeller. I have designated the housing portion of my reaction envelope by the numeral 19. This portion designated lies at the front and the back of the impeller. Extending between the front and the back housings, from a point adjacent to the path cut by the outer marginal edges of the impeller blades, and following easy curves until they terminate approximately perpendicular to the base of the envelope housings are the nozzle foils 20.

It is to be noted that the figures here shown are intended to explain my invention; and that the curves of the foils 20 and the form of the end walls or housings 19 which together form the nozzles or ducts may be so positioned and designed that the curves and cross-sections of the nozzles properly receive and distribute the energized fluid particles with a minimum of losses of energy from fluid turbulence and skin friction and direct said fluid particles for the economic accomplishment of the purpose desired.

The elements of such design are well known to engineers and designers and the proportions of the ducts and the nature of the duct surfaces and structures will vary with the different fluids concerned and the characteristics of the service required. The device as set forth in my drawings will produce useful thrust as disclosed.

When a rotating impeller is immersed in a fluid the resultant direction taken by the fluid particles which leave the periphery of the impeller is influenced in a direction radial to the impeller by centrifugal force and in a direction normal to the impeller blade surface at the point of departure. If we disregard all forces acting upon the fluid particles except those due to impeller rotation which affect movement of the particles parallel with the plane of impeller rotation; and if we further limit our consideration to the fluid cast from a single impeller blade during a single turn of the impeller in rotation, no two particles in a single plane will be cast off in the same direction, and each particle will have a direction that is parallel with, but opposite to, but one other particle.

If the velocity of impeller rotation is constant, the reaction upon the impeller due to the discharge of one particle will be exactly balanced by that due to the discharge of its opposite particle.

If, however, we leave in our envelope a recess for the location of a rotatable impeller and construct about the periphery a system of stationary curved surfaces or foils or ducts which will deflect the fluid particles cast from the impeller, into a common direction of discharge from the said system, the reaction of such discharge will be unbalanced as to the structure as a whole and it will be in a direction opposite to the common direction of discharge and will be equal to the sum of the reactions due to all particles so discharged.

Such a structure of deflecting elements about a rotative impeller is called, in this invention, an impeller reaction envelope.

As to any impeller reaction envelope, a point can be found where the turning moment due to reaction is zero. A line passing through this point in a direction parallel with that of envelope discharge is the line through which the entire reaction (or the resultant thrust) of the envelope may be assumed to act.

The positioning of this line can be governed by design of the reaction envelope. In the design illustrated in Figures 4 and 5 and 6 this line is coincident with impeller axis of rotation; while in that illustrated in Figures 7 and 8 this line is parallel with but not coincident with the impeller rotation axis. In Figures 1 and 2 is shown a design where this line passes at right angles with the axis of impeller rotation but does not intersect it. In the design shown in Figures 1 and 2 the envelope is mounted upon the supporting member for adjustment concentric with impeller rotation.

By means of such mounting the direction of the resultant thrust of the envelope may be adjusted and changed as to the member upon which the envelope and the impeller are mounted. Where an envelope is designed to put the line of thrust through the axis of envelope adjustment, the envelope will, of course, be balanced as to turning moment due to thrust about its adjustment mounting.

It will be observed in the drawings that the envelopes provide a recess wherein the impeller is mounted for rotation, and that the envelope, with its system of foils and ducts, might be rotatably adjusted, with reference to the supporting member, about the impeller rotation axis without deranging the relation of the system of foils and ducts with respect to impeller discharge.

Thus the line of thrust of the envelope might be varied in direction with respect to the supporting member.

Fig. 1 represents a reaction envelope where, in the view shown, the impeller rotates clockwise. The point on the upper portion of the periphery of the impeller where the direction of fluid cast is opposite the direction of envelope discharge lies to the left of the extreme top. The deflecting surfaces or foils or ducts which lead to the right from this point follow an involute curve and the ducts which are formed between the concave and the convex surfaces of the adjacent foils 20 are of uniform cross sectional area from impeller discharge to envelope discharge. The form of curve required, in this design, to conduct the fluid discharged, from the impeller to the left of the division point, to the envelope discharge, required that a portion of each intermediate foil be enlarged in order that the cross sectional area of the bounded ducts be kept uniform.

The numeral 21 designates a fluid inlet port in the front housing of the envelope. Secured to the outer side of the front housing of the envelope and embracing the fluid inlet port 21 is a funnel member 23 having its side walls decreasing in height as they approach the apex of the envelope. The vacuum generated by the impeller will occasion a reduced pressure above the lengthened funnel wall which will result in a reaction upward. This will augment the force due to fluid discharge upon the envelope. Mounted in the mouth of this funnel member are the inwardly extending guides 24. These guides extend transversely at an acute angle to the impeller axis and are perpendicular longitudinally to the thrust line of the envelope. The sum of the openings between these guides should exceed the area of impeller intake in order that there will be no tendency to choke the flow of the incoming fluid. By this arrangement of the guides 24, the fluid passing through the funnel member on the envelope to the impeller intake will strike the guides 24 at an angle. The fluid will be deflected into the intake and the thrust derived from the impulse and reaction on the guides 24 will be transmitted through the funnel to the envelope, from the rotating impeller the fluid will be cast into the space between foils 20 and deflected by their concave walls into the nozzles. The nozzles guide the fluid through and from the reaction envelope.

The change of direction and the discharge of the fluid imparts to the reaction envelope a reaction which is exerted in a direction opposite that of the discharge and which depends for its magnitude upon functions of volume, mass and velocity of the fluid discharged. This reaction will be opposite lines of discharge. It will be noted in Fig. 1, that the discharge nozzles deliver about equal volumes of fluid on either side of the axis of suspension of impeller and reaction envelope, thus imparting a thrust that is balanced or with no turning moment about this axis.

Now, with the reaction or thrust established opposite line of discharge from ducts or nozzles of the envelope, the direction of thrust with respect to the supporting member may be changed by adjusting the reaction envelope with respect to the supporting member. This result is accomplished by rotating shaft 17, operating ring gear 16 to which the envelope is secured. Thus the direction of thrust may be varied and set at any position within the plane of impeller rotation. This device has advantages for use on aircraft, on surface and under-water craft for the promotion of ascent, descent, forward and backward movement and for maneuvering.

In the use of screw propellers, efficiency rapidly drops when the blade tip speed exceeds relatively low limits. This is due partly to cavitation and partly to centrifugal losses. The speeds at which these losses begin to mount is governed partly by propeller design but principally by the nature of the fluid in which the propeller is acting. With my invention blade tip speed is limited only by the speed capacity of prime movers and by the strength of materials of construction. By proper design good efficiencies can be had over a wide speed range.

Figure 4:
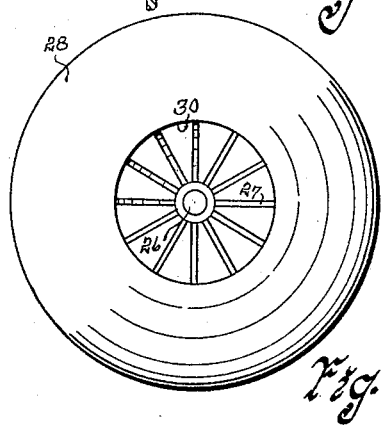
Fig. 4 is a front end view of a modified form of impeller reaction envelope designed to convert centrifugal fluid forces from a rotating impeller or the centrifugal force losses from a rotating screw propeller into axial thrust.
Figure 5:
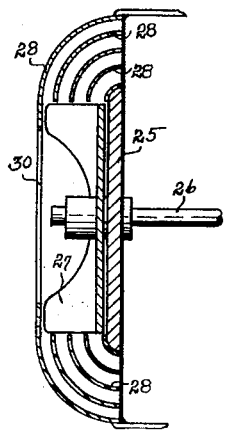
Fig. 5 is a side sectional view of the same device as that shown in Figure 6 and is taken on line 5—5 of that figure.
Figure 6:
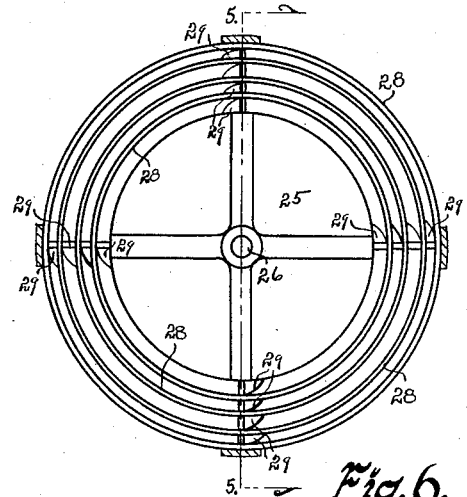
Fig. 6 is a rear end view of the construction shown in Figure 4 and Figure 5.

In Figures 4, 5, and 6, I have shown a modified form of my invention. The modified forms of construction of my invention shown in these figures impart axial thrust in use as will hereinafter be appreciated. In these figures I have designated a rigid spider by the numeral 25. Rotatably mounted in the center of this member is the impeller drive shaft 26 having the impeller 27 in front of spider 25. The numeral 28 designates a plurality of foils constituting with spacer foils 29 my fixed impeller reaction envelope for axial thrust. Foils 28 may be likened to a series of bowls having their bottoms removed and spaced concentric, the smaller bowls within the larger. They are generated about the impeller axis by curves that begin at impeller discharge in a direction parallel with the impeller radius and bend backwardly in easy curves to a direction parallel with the impeller axis.

Foils 29 serve as spacers between foils 28 and these two foil systems divide the reaction envelope into nozzles. The foils or spacers 29 are at right angles to the foils 28 as shown in the drawings and besides spacing the foils 28 apart, their purpose is to correct or change the tangential casting of the fluid from the impeller to axial direction as it passes between the foils, thereby preventing the undesirable whirling of the fluid. In this construction the fluid in the blade travel which is cast therefrom by centrifugal force will be discharged against foils 28 and 29 will change its direction and guide it into the nozzles which discharge it parallel with impeller axis, thus imparting to the reaction envelope an axial thrust. When the reaction envelope is secured to a supporting craft the latter will receive the force of the thrust.

Figure 7:
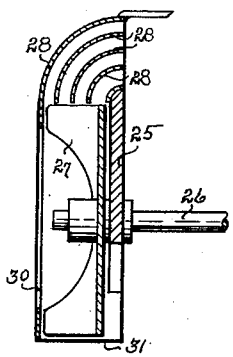
Fig. 7 is still another modified form of construction of my impeller reaction envelope where the force derived from the impeller is converted partly into axial thrust and partly into lateral thrust. This sectional view is taken on the line 7—7 of Fig. 8.
Figure 8:
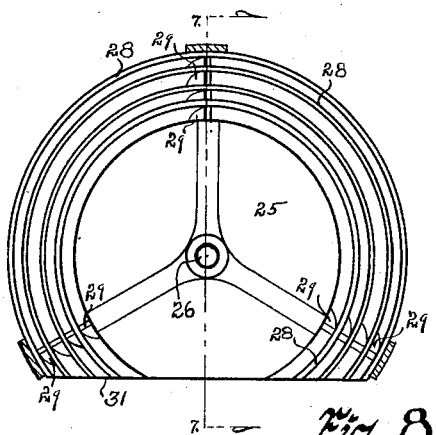
Fig. 8 is a rear end view of the construction shown in Fig. 7.

In Figures 7 and 8 I have used the same numbers to designate like parts shown in Figures 4, 5, and 6. In this construction shown in Figures 7 and 8, a part of the reaction envelope is cut away from part of the discharge arc of the impeller indicated by the numeral 31. Because of the omission of the reaction envelope across a portion of the impeller discharge a reaction toward the impeller center will here be imparted thereby giving lateral component thrust to the device primarily designed for axial thrust.

The cutting away of the base of the reaction envelope serves a further use, in increasing the clearance which might be desired below the path cut by the blades of the impeller. In Figures 4, 5, 6, 7, and 8, I have shown a centrifugal type impeller, but a screw propeller may be used in these reaction envelopes and when this is done the reaction envelope serves three functions, namely, it will save centrifugal losses, it will tend to build up a pressure at the blade tips thus retarding centrifugal losses and it will serve as a guard for the propeller.

This same type of impeller reaction envelope may be used on a horizontal axis with a reaction unit on each side of a boat or an airship or an aeroplane fusilage. The impeller may have intake at either or both ends. The disposition of the guides 24 in the funnel 23 and the outlook of the funnel will be changed to impart impulse and reaction parallel with the plane of impeller rotation.

Application of this type of impeller reaction envelope to boats, submarines and airships is analogous to those described for the aeroplane. For surface craft the guides 24 will usually be omitted, but a controllable shutter may be disposed across the intakes for interrupting fluid inflow during reversal of thrust direction.

This device involves its translation through fluids and hence its exposed exterior surfaces, for proper economy must be stream-lined to conform with the physical laws governing movement through such fluids.

Some changes may be made in the construction and arrangement of my improved impeller reaction envelope without departing from the real spirit and purpose of my invention, and it is my intention to cover by my claims any modified forms of structure or use of mechanical equivalents which may be reasonably included within their scope.

I claim:

1. In a device of the class described, a rotatably mounted impeller designed to impart centrifugal action to a fluid, a reaction envelope housing around said impeller for realizing thrust from said fluid, and a means for adjusting said reaction envelope housing for obtaining thrust in various directions.

2. In a device of the class described, an impeller mounted for rotation, a housing around said impeller having a discharge outlet, a fluid port in the end of said housing and adjacent central portion of said impeller and a plurality of curved foils extending from the locus adjacent the path cut by said impeller and terminating at the discharge of said housing; said foils being so arranged in said housing that the fluid circulated by said impeller will first strike the concave sides of said foils.

3. In a device of the class described, a means for imparting centrifugal action to a fluid, a reaction housing embracing said means having a discharge, and so designed as to change the centrifugal force of said fluid to thrust, a fluid intake port in said reaction envelope, a funnel member embracing said port, and a plurality of guides in said funnel designed to engage the fluid passing into and through said port for obtaining useful thrust.

4. In a device of the class described, an impeller mounted for rotation, a reaction envelope housing around said impeller having a discharge opening, an inlet port in said housing and adjacent said impeller, and a plurality of curved foils in said reaction envelope housing designed to engage the fluid set in motion by said impeller and give a reactive thrust to said envelope housing; said foils and housing being so designed and arranged that the reaction from said fluid at discharge will be so balanced that approximately no turning moment will be experienced by said housing and foils.

5. In a device of the class described, an impeller mounted for rotation, a reaction envelope housing around said impeller having a discharge, a fluid intake port in said housing adjacent the central portion of said impeller, and a plurality spaced apart curved foils in said reaction envelope housing designed to engage a fluid set in motion by said impeller and give a reactive thrust to said envelope housing.

6. In a device of the class described, a rotatably mounted shaft designed to be operatively connected to a prime mover, a centrifugal impeller on said shaft, a reaction envelope embracing said impeller, an inlet port in said envelope adjacent the center portion of said impeller, an outlet port in said envelope extending transversely of said shaft, and a plurality of foils in said envelope having their leading ends adjacent the path cut by said impeller and their trailing ends terminating and extending transversely to said shaft.

7. In a device of the class described, a rotatably mounted shaft designed to be operatively connected to a prime mover, a centrifugal impeller on said shaft, a reaction envelope embracing said impeller, an inlet port in said envelope adjacent the center portion of said impeller, an outlet port in said envelope extending transversely of said shaft, and a plurality of foils in said envelope having their lengths equally spaced apart from each other for receiving between them the fluid cast off from said impeller and guiding said fluid out of said outlet port.

8. In a device of the class described, a rotatably mounted shaft designed to be operatively connected to a prime mover, a centrifugal impeller on said shaft, a reaction envelope embracing said impeller, an inlet port in said envelope adjacent the center portion of said impeller, an outlet port in said envelope extending transversely of said shaft, and a plurality of parallel spaced apart curved foils in said envelope for receiving between them fluid from said impeller in guiding the same to said outlet port; said space between said foils being uniform in cross sectional area throughout the length of said foils.

9. In a device of the class described, a rotatably mounted shaft designed to be operatively connected to a prime mover, a centrifugal impeller on said shaft, a reaction envelope embracing said impeller, an inlet port in said envelope adjacent the center portion of said impeller, an outlet port in said envelope extending transversely of said shaft, and a plurality of spaced apart curved foils in said envelope having their leading ends adjacent the path cut by the periphery of said impeller and their other ends adjacent the said outlet port; said foils being so arranged in said envelope that part of them curve in one direction and part of them in the opposite direction.

10. In a device of the class described, a rotatably mounted shaft designed to be operatively connected to a prime mover, a centrifugal impeller on said shaft, a reaction envelope embracing said impeller, an inlet port in said envelope adjacent the center portion of said impeller, an outlet port in said envelope extending transversely of said shaft, and a plurality of spaced apart curved foils in said envelope having their leading ends adjacent the path cut by the periphery of said impeller and their other ends adjacent the said outlet port; said foils so arranged in said envelope that the greater number of them curve in one direction and the remaining foils curve in the opposite direction.

11. In a device of the class described, a rotatably mounted shaft designed to be operatively connected to a prime mover, a centrifugal impeller on said shaft, a reaction envelope embracing said impeller, an inlet port in said envelope adjacent the center portion of said impeller, an outlet port in said envelope extending transversely of said shaft, a plurality of spaced apart curved foils in said envelope, and an enlarged portion formed on part of said foils.

12. In an impeller reaction envelope, an impeller recess, an intake port and a discharge port, a plurality of spaced apart curved foils extending from the impeller recess to discharge port, and an impeller rotatively mounted within said impeller recess.

13. In a device of the class described, a supporting member; an impeller reaction envelope mounted upon said supporting member for rotative adjustment with respect to said member; said reaction envelope having an impeller recess concentric with the adjustment axis of said envelope; an impeller rotatively mounted in said recess; a fluid discharge port around the periphery of said impeller, said discharge port being divided by a plurality of ducts whose walls are curved from the direction of fluid discharged from impeller laterally so as to approach a common direction; a fluid intake port in said envelope adjacent to the central portion of impeller, said intake port being surrounded by a funnel whose walls are curved from an axial direction so as to approach alignment parallel with the common direction established for the aforesaid plurality of ducts at the discharge, but having its opening in the opposite direction.

14. In a device of the class described, a supporting member, an impeller designed for action in a fluid, rotatably mounted upon said supporting member, and an annular curved surface fixed on said supporting member in the form of a guard about the tip travel of said impeller; said guard being formed to deflect axially as to said impeller, fluid which may escape from said impeller locus of movement through centrifugal action.

15. In a device of the class described, a supporting member, an impeller designed for fluid movement rotatably mounted upon said supporting member, and a plurality of curved ducts leading from adjacent the periphery of impeller blade tips into a common direction; said plurality of curved ducts being fixed to the said supporting member.

16. In a device of the class described, a supporting member, an impeller designed for fluid movement rotatably mounted upon said supporting member, a plurality of curved ducts leading from adjacent the periphery of impeller blade tips so as to approach a common direction, and a single curved duct leading from the middle portion adjacent to said impeller into a different direction; said plurality of curved ducts and said single curved duct being fixed upon said supporting member.

17. In a device of the class described, a supporting member, an impeller designed for fluid movement rotatably mounted upon said supporting member, a plurality of curved ducts leading from adjacent the path of the impeller blade tips, within the plane of impeller rotation so as to approach a common direction, a single curved duct leading from a position adjacent to the middle portion of said impeller toward a direction opposed to that approached by said plurality of ducts; said plurality of ducts and said single duct being structurally joined as a system and being so mounted upon said supporting member that said system is rotatably adjustable about the locus of impeller axis, and a means for rotatably adjusting the said system.

18. In a device of the class described, a supporting member, an impeller designed for action within a fluid rotatably mounted upon said supporting member, a plurality of curved ducts designed to receive the fluid discharged from said impeller by centrifugal action and to deflect it laterally and to discharge it toward a common direction; said plurality of curved ducts being structurally joined into a system and said system being mounted upon said member for rotatable adjustment about the locus of impeller axis; and curved ducts leading to the middle locus of said impeller.

19. In a device of the class described, a supporting member, an impeller designed for action in a fluid rotatably mounted upon said supporting member, a plurality of curved ducts designed and located to receive the fluid discharged from said impeller by centrifugal action and to deflect it toward a common direction at discharge such that the center line of the thrust realized from the reaction of such discharge shall pass approximately through the axis of impeller rotation; said plurality of curved ducts being structurally joined into a system and said system being mounted upon said member for rotative adjustment about the locus of said impeller axis; and curved ducts leading to the mid-locus of said impeller.

20. In a device of the class described, a supporting member, an impeller designed for action within a fluid rotatably mounted upon said supporting member, a plurality of curved ducts designed and located to receive the fluid discharged from said impeller by centrifugal force and to deflect it toward a common direction of discharge such that the center line of reaction realized from discharge shall pass approximately through the axis of impeller rotation; and curved ducts leading from the direction of said reaction to the mid-locus of said impeller; all of said curved ducts being structurally joined into a system; said system being mounted upon said supporting member for rotative adjustment about the locus of said impeller axis.

ARTHUR S. MILLER.